No. 726,945. PATENTED MAY 5, 1903.
H. KRANTZ.
ELECTRICAL OUTLET BOX.
APPLICATION FILED FEB. 26, 1902.
NO MODEL. 2 SHEETS—SHEET 1.

WITNESSES:
F. W. Wright.
S. C. Connor

INVENTOR
HUBERT KRANTZ
BY
Howlan and Howlan
HIS ATTORNEYS.

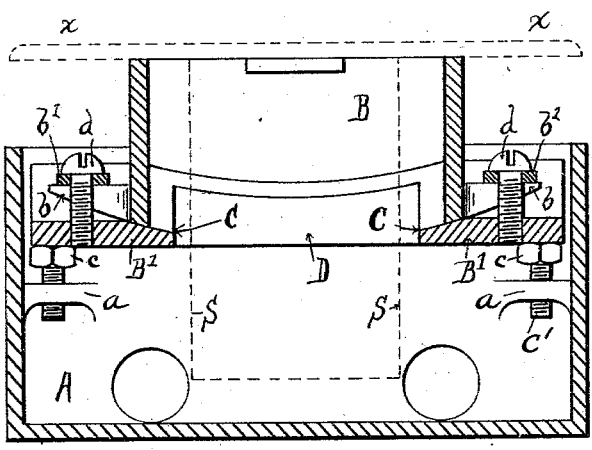

No. 726,945.

Patented May 5, 1903.

UNITED STATES PATENT OFFICE.

HUBERT KRANTZ, OF BROOKLYN, NEW YORK.

ELECTRICAL OUTLET-BOX.

SPECIFICATION forming part of Letters Patent No. 726,945, dated May 5, 1903.

Application filed February 26, 1902. Serial No. 95,780. (No model.)

*To all whom it may concern:*

Be it known that I, HUBERT KRANTZ, a citizen of the United States of America, residing in the borough of Brooklyn, in the county of Kings, State of New York, have invented an Improved Electrical Outlet-Box, of which the following is a specification.

In setting electrical outlet-boxes in walls, ceilings, and other structures it is frequently difficult to insure the placing of the box in proper relation to the surface of the wall, ceiling, or other structure even when special care is taken in setting the box. With careless or unskilled workmen the difficulty constantly occurs.

The object of my invention is to so construct the box that the receptacle-carrying part can have the plane of its face adjusted in relation to the plane of the box after the latter has been set and so get the face of the said receptacle in proper relation to the surface of the wall or other structure no matter how much out of position the box itself may have been placed by error of the workmen or otherwise.

Figure 1:
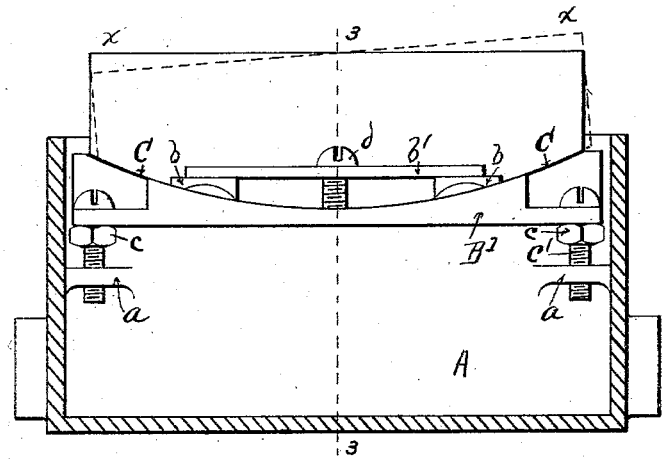
Figure 2:
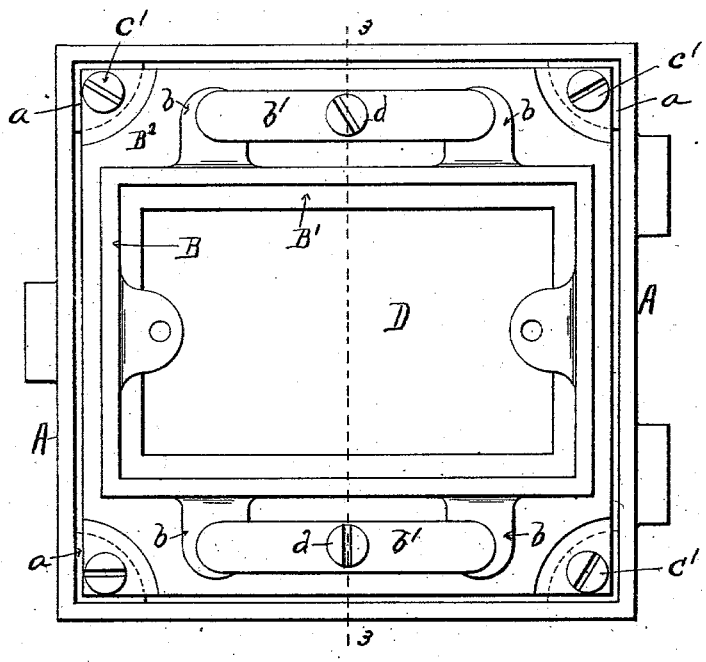

In the accompanying drawings, Figure 1 is a longitudinal section through the body of a box embodying my invention. Fig. 2 is a sectional plan view of the same; and Fig. 3 is a transverse section on the line 3 3, Fig. 1.

In the drawings I have shown the body A of the box of square section, but it may be of any other suitable shape, and I have shown the receptacle part as of oblong section, Fig. 2, to hold a push-button switch, cut-out, or the like, (indicated by dotted lines in Fig. 3;) but it will be understood that this receptacle may be of a shape or construction to receive any electrical appliance desired to be set into an outlet-box. This receptacle is in two parts, consisting of the receptacle proper, B, and a plate B', on which the part B rests with a ball-joint connection, so that within convenient limits the part B can be rocked on the part B' to change the angle of the face plane $x x$ of the receptacle B in relation to the plane of the back or body of the box A. This ball-joint is clearly shown at C C, Figs. 1 and 3. The plate B' has a sufficiently large opening D, Fig. 3, through it for the free passage and play for adjustment of the switch-box or other such appliance, which is indicated by dotted lines at S, Fig. 3. To lock the part B to the part B' and in the desired angular adjustment, I may provide any suitable means. In the drawings I have indicated the part B as provided with a pair of lugs $b\ b$ on each side, clamping-plates B', resting on the lugs, and securing-screws $d$, threaded into the plate B'. This construction permits not only the described angular adjustment on the ball-joint, but a limited rotary adjustment as well, if that be desired. The plate B' is secured to the box A so as to be adjustable also toward and from the back of the box within limits. For this purpose I cast or otherwise apply to the box, preferably at the corners, lugs $a\ a$, into which are threaded set-screws C', passing freely through openings in the corners of the plate B'. Nuts $c\ c$ on the set-screws at the under side of the plate B', Figs. 1 and 3, hold the plate B' to the screw-heads, so that by turning the screws the two parts B and B' may be adjusted toward or from the back of the box A. By this adjustment and by the angular and rotary adjustment of the part B on B', I am enabled to compensate for variations in the set of the box with relation to the face of the wall, ceiling, or other structure.

I claim as my invention—

1. An electrical outlet-box, having a receptacle part with an opening to hold a switch or the like within the box and a ball-joint adjustment for the said receptacle part, as and for the purpose described.

2. An electrical outlet-box, having a receptacle in two parts with an opening to hold a switch or the like within the box, and an adjustable ball-joint connection between the two parts, substantially as described.

3. An electrical outlet-box, having a receptacle in two parts, with an opening to hold a switch or the like within the box, an adjustable ball-joint connection between the two parts, and means for adjusting the two parts toward and from the back of the box.

In testimony whereof I have signed my name to this specification in the presence of two subscribing witnesses.

HUBERT KRANTZ.

Witnesses:
HERMAN LEHRENKRAUSS,
ALBERT LANDBECK.